3,655,790
STABLE COMPLEXES OF ORGANOMAGNESIUMS WITH ALKALI METAL HYDRIDES
Eugene C. Ashby, 2516 Flair Knoll Drive NE., Atlanta, Ga. 30329
No Drawing. Filed Feb. 9, 1970, Ser. No. 9,998
Int. Cl. C07f 1/02, 1/04, 3/02
U.S. Cl. 260—665 R  23 Claims

ABSTRACT OF THE DISCLOSURE

Stable complexes of organomagnesiums, such as di-s-butylmagnesium, with alkali metal hydrides, such as potassium hydride. They are useful for a variety of purposes, such as reducing agents for organic compounds and as metalating agents for aromatic compounds.

---

My invention relates to the production of novel and useful compounds in the form of stable complexes of organomagnesiums with alkali metal hydrides. Said complexes are useful for a variety of purposes among which are as reducing agents for reducing various organic compounds and as metalating agents for metalating aromatic compounds.

The reaction of diethylmagnesium with alkali metal hydrides in ether solvents has heretofore been reported (G. E. Coates and J. A. Heslop, J. Chem. Soc., (A), (1968) 514). While the authors concluded that complexes might exist in solution, extensive ether cleavage resulted and the assumed complexes could not be isolated.

I have discovered that stable complexes of certain organomagnesiums with alkali metal hydrides can be prepared, as described below. So far as I am aware, such complexes have not heretofore been known or suggested. I have also found that various of said stable complexes are soluble in liquid hydrocarbons and that they are effectively utilizable in the form of such hydrocarbon solutions for a number of purposes.

The novel complexes of my invention can be represented by the formula $M_nMgR^1R^2H_n$ where M is sodium, potassium, lithium or cesium, $R^1$ and $R^2$ are the same or different $C_3$–$C_{15}$ alkyl (1°, 2° or 3°), aryl or aralkyl, or cycloalkyl; and $n$ is ½, 1, 2 or 3. Of particular value are those of the aforesaid complexes where M is potassium, $R^1$ and $R^2$ are each s-butyl and phenyl, and $n$ is 2. Illustrative examples of said complexes are the following, where M is as indicated above, particularly sodium or potassium.

MMg(s-Bu)$_2$H
M$_2$Mg(s-Bu)$_2$H$_2$
M$_2$Mg(s-Bu·n-Bu)H$_2$
M$_3$Mg(s-Bu)$_3$H$_2$
MMg(n-amyl)$_2$H
M$_2$Mg(n-amyl)$_2$H$_2$
MMg$\phi_2$H
M$_2$Mg$\phi_2$H$_2$
M$_2$Mg($\phi$·s-Bu)H$_2$
MMg(tolyl)$_2$H
M$_2$Mg(tolyl)$_2$H$_2$
MMg$\phi_2$H·Mg$\phi_2$
MMg(s-Bu)$_2$H·Mg(s-Bu)$_2$ It will be understood that the formulae representing the complexes of the present invention can be written in a number of different ways. Thus, for instance, in the case of the complex KMg$\phi_2$H·Mg$\phi_2$, the same complex also can be expressed by either of the following formulae: (KH)$_{1/2}$Mg$\phi_2$ and KH·(Mg$\phi_2$)$_2$.

The complexes are desirably prepared by reacting the organomagnesium with the alkali metal hydride in an inert liquid medium, particularly a liquid hydrocarbon, at a temperature in the range of about 0° C. to 150° C., preferably, in most cases, in the range of about 25° C. to 100° C.

The organomagnesiums which can utilized to form the stable complexes of the present invention are dialkylmagnesiums in which the alkyl radicals each contain from 3 to 15 carbon atoms, dicycloalkylmagnesiums, and diarylmagnesiums and carbocyclic diaralkylmagnesiums, illustrative examples of which are di-n-propylmagnesium, diisopropylmagnesium, isopropyl-isobutyl magnesium, di-n-butylmagnesium, di-s-butylmagnesium, s-butyl-n-amyl magnesium, di-n-amylmagnesium, diisoamylmagnesium, dihexylmagnesiums, diheptylmagnesiums, dioctylmagnesiums, dinonylmagnesiums, s-butyl-isooctyl magnesium, didecylmagnesiums, didodecylmagnesiums, ditridecylmagnesiums, ditetradecylmagnesium, dipentadecylmagnesium, dicylcohexylmagnesium, dicyclooctylmagnesium, diphenylmagnesium, di-p-tolylmagnesium, di-p-anisylmagnesium, dibenzylmagnesiums and dixylylmagnesiums. While, as indicated, in the case of the complexes of the dialkylmagnesiums, the alkyl radicals may contain as low as 3 carbon atoms, such complexes are far less desirable than those in which the alkyl radicals contain at least 4 carbon atoms. Accordingly, the particularly important complexes of the dialkylmagnesiums with the alkali metal hydrides are those in which each of the alkyl radicals contains from 4 to 15 carbon atoms and especially useful are those in which the alkyl radicals contain from 4 to 5 carbon atoms, notably those in which the dialkylmagnesium is di-s-butylmagnesium.

Of the alkali metal hydrides with which the organomagnesiums are reacted to produce the stable complexes of the present inventions, sodium hydride and potassium hydride are especially useful. However, lithium hydride and cesium hydride can also be employed. The complexes which are made from lithium hydride, generally speaking, are not as stable as those of said other alkali metals.

The reaction media in which the complexes of the present invention are most desirably prepared are liquid hydrocarbons, which may be of aliphatic, cycloaliphatic or aromatic character, illustrative examples of which are n-pentane, n-hexane, n-heptane, octane, cyclohexane, cyclooctane, benzene, toluene, ethylbenzene, xylenes, and mixtures of any two or more thereof. Non-aromatic tertiary monoamines and tertiary polyamines can also be used, illustrative examples of which are triethylamine, triisopropylamine, triisobutylamine, N-methylpiperidine, N,N' - dimethylpiperazine, N,N' - tetramethylethylenediamine and triethylenediamine. Generally speaking, ethers should be avoided since, as has been pointed out above, they cause cleavage of the complexes and, thus, they do not permit the formation and isolation or recovery of the stable complexes. In isolated instances I have found that ethers can be used, as in the production of a complex of diphenylmagnesium with potassium hydride in a diethyl ether reaction medium at room temperature.

The novel stable complexes of the present invention are useful for a variety of purposes as, for instance, reducing agents for the reduction of organic compounds such as aromatic ketones exemplified by benzophenone; and as metalating agents for metalating aromatic compounds such as benzene, toluene, xylenes and anisole.

The following are illustrative examples of the practice of the present invention. Other examples will readily occur to those skilled in the art in the light of the guiding principles and teachings disclosed herein.

EXAMPLE 1

Di-s-butylmagnesium (s-Bu$_2$Mg) is stirred with an equivalent amount of potassium hydride in a cyclohexane reaction medium, at a temperature of 30° C. for several hours until the potassium hydride dissolves. Analysis of the solution shows a K:Mg:H ratio of 1.01:1.00:1.02 Removal of the solvent under vacuo results in leaving a light yellow oil (comprising a complex corresponding to the formula KMg(s-Bu)$_2$H) whose infrared spectrum shows a broad absorption indicative of the Mg-H stretching vibration and a slight broadening of the absorption band at 521 cm.$^{-1}$ observed for the C-Mg stretching vibration of di-s-butylmagnesium. A cryoscopic molecular weight determination in benzene indicates a monomer-dimer equilibrium over a concentration range from 0.06–0.16 m. The NMR spectrum is also consistent with complex formation. The sextet, attributed to the αH of the s-butyl group in di-s-butyl-magnesium, is found 424 cps. upfield from benzene. In the KH complex, this sextet is shifted 52 cps. upfield and becomes somewhat broadened. In addition a new peak is observed 232 cps. upfield from benzene. Integration of the absorption peaks gives a ratio (approximately 1:2) consistent with the complex KMg(s-Bu)$_2$H It has been observed that, when either excess potassium hydride is stirred with KMg(s-Bu)$_2$H, or when 2 equivalents of potassium hydride are stirred with 1 equivalent of di-s-butyl-magnesium, precipitation of the magnesium-containing species occurs.

2KH+s-Bu$_2$Mg→K$_2$Mg(s-Bu)$_2$H$_2$←KMg(s-Bu)$_2$H+KH

Thus, it appears that the soluble complex is a 1:1 adduct. The 2:1 complex is isolated as a light green powder which darkens if exposed in a dry box for extended periods of time. This powder is highly flammable in air.

EXAMPLE 2

2 equivalents of s-Bu$_2$Mg and 1 equivalent of sodium hydride are reacted in cyclohexane at a temperature of 40° C. for about 2 days to produce a complex corresponding to the formula NaMg(s-Bu)$_2$H·s-Bu$_2$Mg. The infrared spectrum shows a broad absorption indicative of the Mg-H stretching vibration. The C-Mg absorption band is observed at 515 cm.$^{-1}$, a small shift from the band at 521 cm.$^{-1}$ observed for the s-Bu$_2$Mg itself. A new peak in the NMR spectrum is observed 232 c.p.s. upfield from benzene for the hydridic hydrogen. The sextet due to the αH of the butyl group is shifted upfield 40 c.p.s.

EXAMPLE 3

1 equivalent of potassium hydride is reacted with a slight excess over 2 equivalents of diphenylmagnesium in a diethyl ether medium at a temperature of 30° C. until a complex forms in the form of an insoluble solid which, on analysis, is shown to correspond to the formula KH·2Mgφ$_2$. The excess diphenylmagnesium remains in solution. In this particular case, it appears that the complex forms and precipitates out before cleavage occurs by the diethyl ether.

EXAMPLE 4

1 equivalent of potassium hydride is reacted with 1 equivalent of dicyclohexylmagnesium in a cyclohexane medium at a temperature of 40° C. until the complex is formed.

EXAMPLE 5

1 equivalent of cesium hydride is reacted with 1 equivalent of di-s-butylmagnesium in a toluene medium at 30° C. until the complex is formed.

As illustrative of uses of the complexes of the present invention are those described in the following Examples 6 and 7.

EXAMPLE 6

Use of KMg(s-Bu)$_2$H as a hydrocarbon-soluble reducing agent

To 18.2 g. (0.10 mole) of benzophenone in 100 ml. of benzene is added 20 g. (0.11 mole) of KMg(s-Bu)$_2$H dissolved in 100 ml. of benzene. An immediate reaction takes place after which the reaction mixture is allowed to stir at room temperature for 2 hours. On hydrolysis of the reaction mixture, benzhydrol (14.7 g.) is isolated in 80% yield by distillation. The compound is identified by infrared analysis comparison of an authentic sample of benzhydrol.

NOTE: KH by itself does not reduce benzophenone to benzhydrol.

EXAMPLE 7

Use of KMg(s-Bu)$_2$H as a metalating agent

To 17.8 g. (0.10 mole) of KMg(s-Bu)$_2$H is added 100 ml. of benzene and the resulting solution is allowed to stand for 2 weeks. During this time a white precipitate forms. Reaction of the resulting mixture with CO$_2$ followed by hydrolysis produces benzoic acid in 73% yield. Benzoic acid is identified by its M.P. (121° C.) and comparison of its infrared spectrum with that obtained from an authentic sample.

The complexes can also be prepared in the form of their tetraalkylammonium derivatives, that is, where the alkali metal of the alkali metal hydride present in the complex is replaced by tetraalkylammonium. Thus, for instance, the complex KMg(s-Bu)$_2$H dissolved in a liquid hydrocarbon such as cyclohexane, benzene or toluene is admixed with an equivalent amount of a tetraalkylammonium halide, such as tetramethylammonium chloride, tetraethylammonium chloride, dodecyltrimethylammonium chloride, or the corresponding bromides. Potassium chloride or potassium bromide, as the case may be precipitates out, leaving in solution, the complex in which tetraalkylammonium has replaced the potassium. Said complexes are useful for the same purposes as the described complexes of the alkali metal hydrides.

I claim:
1. A process for preparing stable complexes which comprises reacting an alkali metal hydride with an organomagnesium selected from the group of C$_3$–C$_{15}$ dialkylmagnesiums cycloalkylmagnesiums, arylmagnesiums and aralkylmagnesiums in a reaction medium selected from the group of liquid hydrocarbons, tertiary monoamines and tertiary polyamines.

2. The process of claim 1 in which the organomagnesium is a C$_4$–C$_{15}$ dialkylmagnesium.

3. The process of claim 2 in which the organomagnesium is s-dibutylmagnesium.

4. The process of claim 1 in which the organomagnesium is a member of the group of diphenylmagnesium and ditolylmagnesium.

5. The process of claim 2 in which the reaction medium is a member of the group of benzene, toluene, hexane, cyclohexane, heptane and octane.

6. A complex of an alkali metal hydride, in which the alkali metal is selected from the group of sodium, potassium, lithium and cesium, with an organomagnesium selected from the group of C$_3$–C$_{15}$ dialkylmagnesiums, dicycloalkylmagnesiums and diarylmagnesiums.

7. A complex corresponding to the formula $$M_nMgR^1R^2H_n$$

where M is an alkali metal selected from the group of sodium, potassium, lithium and cesium, R$^1$ and R$^2$ are the same or different C$_4$–C$_{15}$ alkyl. cycloalkyl, aryl and aralkyl, and n is 1, 2 or 3.

8. A complex according to claim 7 in which M is potassium.

9. A complex according to claim 8 in which R$^1$ and R$^2$ are each C$_4$–C$_5$ alkyl, and n is 1 or 2.

10. A complex according to claim 9 in which R$^1$ and R$^2$ are each s-butyl.

11. A complex according to claim 10 in which the complex corresponds to the formula KMg(s-Bu)$_2$H.

12. A complex according to claim 7 in which the complex corresponds to the formula $$NaMg(s\text{-}Bu)_2H \cdot s\text{-}Bu_2Mg$$

13. A complex according to claim 7 in which $R^1$ and $R^2$ are each a member of the group of phenyl and tolyl, and $n$ is 1 or 2.

14. A solution in a liquid hydrocarbon of the complex of claim 7.

15. A solution in a liquid hydrocarbon of the complex of claim 11.

16. A solution in a liquid hydrocarbon of the complex of claim 12.

17. A solution in a liquid hydrocarbon of the complex of claim 13.

18. A complex of a tetraalkylammonium hydride, with an organomagnesium selected from the group of $C_3$–$C_{15}$ dialkylmagnesiums, dicycloalkylmagnesiums and diarylmagnesiums.

19. A complex corresponding to the formula $$M_nMgR^1R^2H_n$$

where M is tetraalkylammonium, $R^1$ and $R^2$ are the same or different $C_4$–$C_{15}$ alkyl, cycloalkyl, aryl and aralkyl, and $n$ is 1, 2 or 3.

20. A complex according to claim 19 in which tetraalkylammonium is tetramethylammonium, in which $R^1$ and $R^2$ are each $C_4$–$C_5$ alkyl, and $n$ is 1 or 2.

21. A solution in a liquid hydrocarbon of the complex of claim 18.

22. A solution in a liquid hydrocarbon of the complex of claim 19.

23. A solution in a liquid hydrocarbon of the complex of claim 20.

References Cited

UNITED STATES PATENTS

| | | | |
|---|---|---|---|
| 3,073,884 | 1/1963 | Pinkerton | 136—100 |
| 3,171,849 | 3/1965 | Kobetz | 260—429.9 |

OTHER REFERENCES

Hurd, Chemistry of the Hydrides (1952), John Wiley and Sons, Inc. New York, N.Y., p. 32.

Coates et al., J. Chem. Soc. A. (1968), pp. 514–8.

Eberhardt, J. Org. Chem. 29 (1964), pp. 643–5.

DELBERT E. GANTZ, Primary Examiner

A. P. DEMERS, Assistant Examiner

U.S. Cl. X.R.

260—515 R, 618 B, 618 R, 665 G